(12) United States Patent
Kirino et al.

(10) Patent No.: US 6,410,133 B1
(45) Date of Patent: Jun. 25, 2002

(54) MAGNETIC RECORDING DISK, METHOD OF THE MAGNETIC RECORDING DISK AND MAGNETIC RECORDING APPARATUS

(75) Inventors: Fumiyoshi Kirino, Tokyo; Nobuyuki Inaba, Hasuda; Ken Takahashi, Tokai; Takashi Naitou, Hitachiota; Sumio Hosaka, Hinode; Eiji Koyama, Tsuchiura; Motoyasu Terao, Hinode; Hiroki Yamamoto, Hitachi; Hiroki Kuramoto, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/478,377

(22) Filed: Jan. 6, 2000

(30) Foreign Application Priority Data

Jan. 7, 1999 (JP) .......................................... 11-001667

(51) Int. Cl.$^7$ ............................. G11B 5/66; G11B 5/70; G11B 5/82

(52) U.S. Cl. ............................ 428/336; 428/694 TS; 428/694 TM; 428/900; 360/135

(58) Field of Search .......................... 360/97.01, 254.1, 360/254.2, 254.3, 254.4, 254.5, 254.6, 254.7, 254.8, 254.9, 255, 255.1, 255.2, 255.3, 255.4, 255.5, 255.6, 255.7, 255.8, 255.9, 131, 135; 428/694 TS, 336, 900, 694 TM

(56) References Cited

U.S. PATENT DOCUMENTS

4,652,499 A * 3/1987 Howard ...................... 428/641
6,231,968 B1 * 5/2001 Hiramoto et al. ........... 428/332

FOREIGN PATENT DOCUMENTS

JP            011442649 A  *  6/1989

* cited by examiner

Primary Examiner—Holly C. Rickman
(74) Attorney, Agent, or Firm—Antonelli, Terry, Stout & Kraus, LLP

(57) ABSTRACT

A magnetic recording medium includes a non-magnetic substrate, an inorganic compound layer that is formed on the substrate and which contains a crystalline first oxide and a second oxide, and a magnetic layer that is formed on the inorganic compound layer. The crystalline first oxide comprises at least one oxide selected from cobalt oxide, chromium oxide, iron oxide and nickel oxide. The second oxide comprises at least one oxide selected from silicon oxide, aluminum oxide, titanium oxide, tantalum oxide and zinc oxide. The second oxide is present at a grain boundary of crystal grains of said first oxide. According to the present invention, magnetic recording media low in noise and diminished in thermal fluctuation and thermal decay can be obtained by making fine the crystal grains of a magnetic layer and controlling the dispersion of the grain size. Thus, magnetic recording apparatuses can be realized which can perform an ultrahigh density magnetic recording of higher than 20 Gb/in$^2$.

6 Claims, 5 Drawing Sheets

MAGNETIC HEAD 85
84
83
82 RECORDING HEAD
81 READ BACK HEAD

MAGNETIC RECORDING DISK, METHOD OF THE MAGNETIC RECORDING DISK AND MAGNETIC RECORDING APPARATUS

BACKGROUND OF THE INVENTION

The present invention relates to magnetic recording apparatuses having high performance and high reliability, magnetic recording media for realizing the apparatuses and methods for fabricating the same.

With recent remarkable development of a high information-oriented society, multi-media which combine information of various forms are rapidly spread. One of the information recording apparatuses which support the rapid spread of multi-media includes magnetic recording apparatuses such as magnetic recording disks. At present, improvement in recording density and miniaturization are attempted for magnetic recording disks. Furthermore, reduction in price of magnetic recording disks is being rapidly forwarded.

For realization of high density magnetic recording of magnetic recording disks, the following are essential techniques: (1) reduction of the spacing between the magnetic recording disk and a magnetic head, (2) increase of coercivity of the magnetic recording disks, and (3) new devising of signal processing method.

Among them, as for the magnetic recording disks, in order to realize a recording density exceeding 10 $Gb/in^2$, it is necessary to reduce the switching volume of magnetic layer occurs as well as to increase the coercivity. For this purpose, magnetic grains constituting the magnetic layer must be fine in their size. Furthermore, in addition to the reduction of size of the magnetic grains, uniformity in distribution of the size is important from the viewpoint of thermal fluctuation. For the control of the size of magnetic grains in the magnetic layer and the distribution of the size, U.S. Pat. No. 4,652,499 proposes to provide a seed thin layer under the magnetic layer.

SUMMARY OF THE INVENTION

However, in the conventional method, there is a limit in control of crystal grain size and distribution of the crystal grain size of the magnetic layer constituting the magnetic recording disk, and fine grains and coarse grains coexist in the magnetic layer. In the case of recording an information (in the case of magnetic inversion), the magnetic layer in this state sometimes cannot attain stable recording when ultra-high density recording higher than 10 $Gb/in^2$ is carried out because of the influence of leakage field from the surrounding magnetic grains or the interaction with the large magnetic grains.

Accordingly, the first object of the present invention is to provide a magnetic recording medium of high performance and low noise by making finer the size of magnetic grains in the magnetic layer. The second object of the present invention is to provide a magnetic recording medium of low noise, low thermal fluctuation and low thermal decay by controlling the distribution of the magnetic grain size to become uniform. The third object of the present invention is to provide a magnetic recording medium suitable for high density magnetic recording by controlling the crystalographic orientation of the magnetic layer. The fourth object of the present invention is to provide a magnetic recording medium reduced in magnetic inversion unit at the time of recording or erasion by reducing magnetic interaction between magnetic grains. The fifth object of the present invention is to provide a magnetic recording medium capable of performing an ultra-high density magnetic recording of higher than 10 $Gb/in^2$.

The above objects can be attained by a magnetic recording medium comprising a non-magnetic substrate, an inorganic compound layer which is formed on the substrate and which contains a crystalline first oxide (which is in the form of crystal grains according to X-ray diffraction) comprising at least one oxide selected from cobalt oxide, chromium oxide, iron oxide and nickel oxide and a second oxide comprising at least one oxide selected from silicon oxide, aluminum oxide, titanium oxide, tantalum oxide and zinc oxide, said second oxide being present at grain boundary of crystal grains of said first oxide, and a magnetic layer formed on said inorganic compound layer.

Moreover, the inorganic compound layer preferably has such a structure that the crystal grains of the first oxide have a hexagonal honeycomb structure, the grains are two-dimensionally regularly arranged, and the second oxide is present as amorphous substance (measured to be amorphous according to X-ray diffraction) at the crystal grain boundary of the first oxide. The crystal grains of the first oxide are made fine, and distribution of the size is nearly uniform. The crystal grains are most preferably crystallographically oriented.

Orientation, crystal grain size and distribution of the crystal grain size of the inorganic compound layer can be controlled by optionally selecting the constituent material and the concentration (composition) of the first oxide and the second oxide or the conditions for the formation of the layer.

The inorganic compound layer formed on the substrate is preferably of prismatic texture in which the crystal grains of the first oxide grow in thickness direction of the layer. In this case, thickness of the layer is preferably about 10–100 nm.

Furthermore, the inorganic compound layer made in platy form can be used as a substrate. In this case, the crystal grains of the first oxide preferably have a prismatic texture in thickness direction.

When the magnetic layer is formed on the inorganic compound layer, the magnetic layer is epitaxially grown from the crystal grains in the inorganic compound layer. Since the amorphous second oxide is precipitated at the grain boundary of the crystal grains in the inorganic compound layer, the magnetic layer epitaxially grows on the crystal grains and does not epitaxially grow on the amorphous portion. Thus, the growing state of the magnetic layer on the crystal grains differs from that on the amorphous crystal grain boundary in the inorganic compound layer, resulting in variation of orientation or texture of the magnetic layer. This variation causes variation of magnetic properties, and the magnetic interaction between the crystal grains constituting the magnetic layer can be diminished.

Furthermore, the spacing between the crystal grains in the inorganic compound layer can also be easily controlled by controlling the composition of the compound. The magnetic interaction between the magnetic crystal grains can be diminished by the control of the spacing.

By diminishing the magnetic interaction between the crystal grains constituting the magnetic layer, a zigzag pattern present in the magnetic transition area can be made smaller. Specifically, width of the zigzag pattern present in the magnetic transition area of the track of the magnetic recording medium can be made less than the gap length of a recording head. The width of the zigzag pattern may not necessarily be smaller than the gap length along the whole track, but it is ideal that the width is smaller than the gap length along the whole track. The relation between the width of the zigzag pattern and the gap length in this case is shown in FIG. 9. In this way, noise of the magnetic recording media can be reduced. Furthermore, since influence of noise can be made small even when the width of the track is reduced, track density can be lowered.

In order to perform smooth epitaxial growth, it is preferred that the crystal structure of the crystal grains in the inorganic compound layer is the same as or similar to the structure of the magnetic grains constituting the magnetic layer. The term "similar to" here means that the difference of lattice constant of the crystal grains in the inorganic compound layer from that of the magnetic grains constituting the magnetic layer is within the range of ±10%. However, when the difference of lattice constant of the crystal grains in the inorganic compound layer from that of the magnetic grains constituting the magnetic layer is outside the range of ±10%, a layer having a lattice constant which is middle between both the lattice constants can be provided between the two layers.

When the magnetic layer is epitaxially grown from the inorganic compound layer as mentioned above, form and size of crystal grains in the inorganic compound layer become nearly the same as those in the magnetic layer. That is, the size of crystal grains in the magnetic layer is determined by the size of crystal grains in the inorganic compound layer. Therefore, the crystal grains of the magnetic layer become fine and distribution of the size becomes uniform. Specifically, the average grain size of the crystal grains of the magnetic layer is preferably 10 nm or less, and the distribution of the grain size is preferably 2 nm or less in terms of standard deviation σ.

Furthermore, the crystal grains in the inorganic compound layer are made fine and the distribution of the size is uniform, and the grains are regularly arranged. Therefore, the crystal grains of the magnetic layer formed thereon also become fine, and the distribution of the size is uniform and can be controlled so that the grains are regularly arranged. Accordingly, noise, thermal fluctuation and thermal decay caused by the magnetic recording media can be diminished.

By the above-mentioned techniques, magnetic inversion unit and size thereof in magnetic recording media can be made small. The magnetic inversion unit here is defined as follows. The minimum unit of inversion is assumed to be one crystal grain of the magnetic layer, and the number of units corresponding to the number of the crystal grains of the magnetic layer when recording or erasion is carried out is determined by observation with a magnetic force microscope (MFM) or the like.

Here, it is preferred to use, as the magnetic layer, a ferromagnetic thin layer of an alloy mainly composed of Co and additionally containing Pt and at least one element selected from Cr, Ta and Nb. Furthermore, in the structure of this ferromagnetic thin layer, at least one element selected from Cr, Ta and Nb is present in the form of segregation at the grain boundary of Co crystal grains.

Moreover, there is provided a magnetic recording apparatus comprising the magnetic recording medium, a driving part which rotates the magnetic recording medium, a recording head comprising a recording part and a read back part, and a means of moving the recording head relative to the magnetic recording medium. Thus, a magnetic recording apparatus can be realized which can perform high density magnetic recording of higher than 10 Gb/in$^2$, furthermore, higher than 20 Gb/in$^2$. In addition, various information such as images, code data and audios are recorded in this apparatus or read back from this apparatus, or the information is erased.

Figure 1:
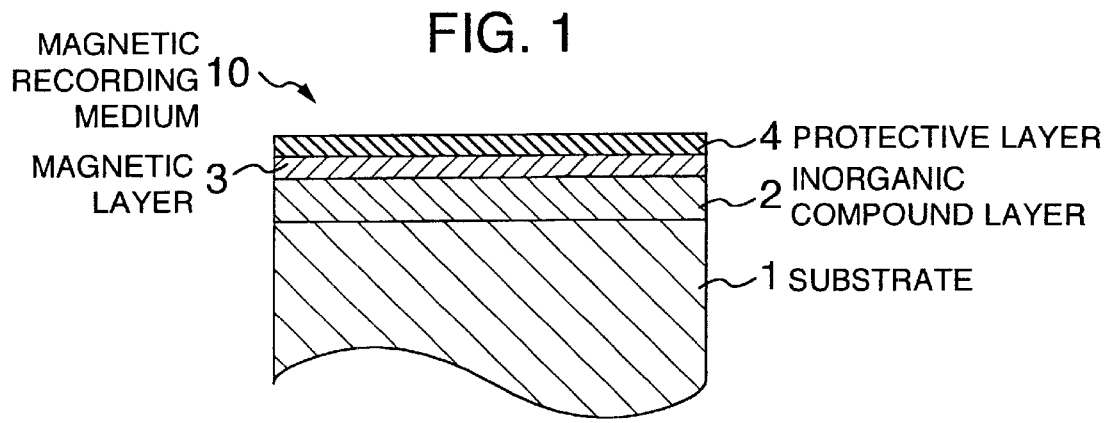
FIG. 1 shows a sectional structure of the magnetic recording medium in Example 1 of the present invention.

In the drawings, 1 indicates a substrate, 2 indicates an inorganic compound layer, 3 indicates a magnetic layer, 4 indicates a protective layer, 5 indicates a lattice constant controlling layer, and 10 indicates a magnetic recording medium.

DETAILED DESCRIPTION OF THE INVENTION

The present invention will be explained in detail by way of the following examples.

EXAMPLE 1

FIG. 1 shows the sectional structure of the magnetic recording medium in Example 1 of the present invention. As substrate 1, a glass substrate of 2.5" in diameter was used. An Al or Al alloy substrate can also be used, and the size of the substrate can also be changed. An inorganic compound layer 2 of 30 nm thick was formed on the substrate 1 by sputtering method using a target comprising a sintered mixture of cobalt oxide (CoO) and silicon oxide (SiO$_2$) at 2:1. In carrying out the sputtering, pure Ar was used as a discharge gas, discharge gas pressure was 3 mTorr, and applied DC power was 1 kW/150 mmφ. The substrate was heated at 300° C. during the sputtering.

Figure 2:
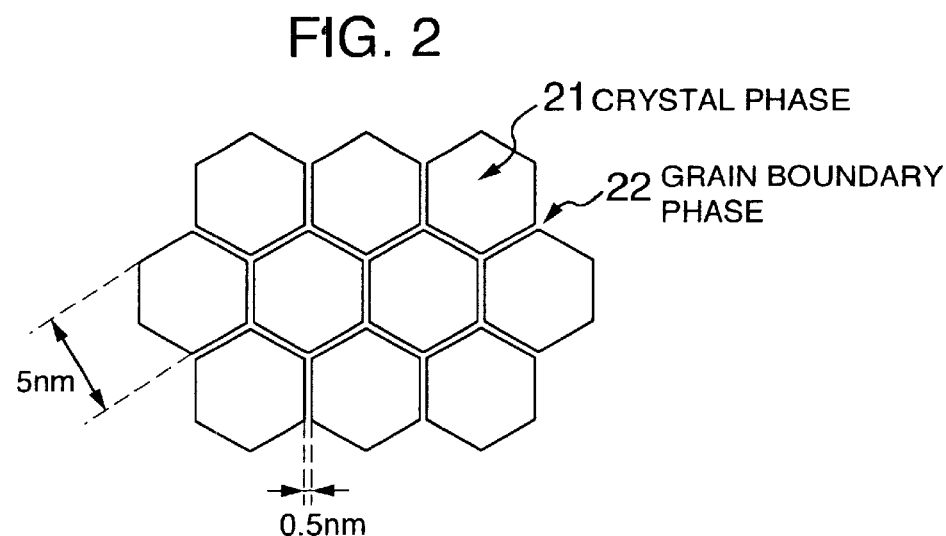
FIG. 2 schematically shows the structure of the inorganic compound layer.

The surface of the resulting inorganic compound layer 2 was observed by TEM to find that crystal grains having honeycomb structure of regular hexagon of 9 nm were regularly arranged as shown in FIG. 2. The spacing between crystal grains 21 was 0.5–1.0 nm. The crystal grains 21 comprised cobalt oxide, and silicon oxide was present at the grain boundary 22. The structure of the inorganic compound layer 2 was observed by X-ray diffractometry to find that the cobalt oxide was crystalline and the silicon oxide was amorphous. Lattice constant of the crystal grains 21 was nearly equal to that of Co.

The mixing ratio of CoO and SiO$_2$ and the sputtering conditions can be optionally selected. Furthermore, an oxide of a metal differing in ion radius from Co (e.g., oxide of chromium, iron or nickel) may be added to CoO.

A Co$_{69}$Cr$_{19}$Pt$_{12}$ layer of 12 nm thick was formed as a magnetic layer 3 on the inorganic compound layer 2 by sputtering method. A Co—Cr—Pt alloy was used as a target in the sputtering, and pure Ar was used as the discharge gas. The discharge gas pressure was 3 mTorr and the applied DC power was 1 kW/150 mmφ.

Finally, a carbon (C) layer of 5 nm thick was formed as a protective layer 4 on the magnetic layer 3 to obtain a magnetic recording medium 10. The sputtering conditions were pure Ar as the discharge gas, 5 mTorr as the discharge gas pressure, and 1 kW/150 mmφ as the applied DC power density. A gas containing nitrogen may be used in place of the Ar gas as the discharge gas. By using this gas, C particles become fine and hence the resulting protective layer is densified and the protection performance can be improved.

Figure 3:
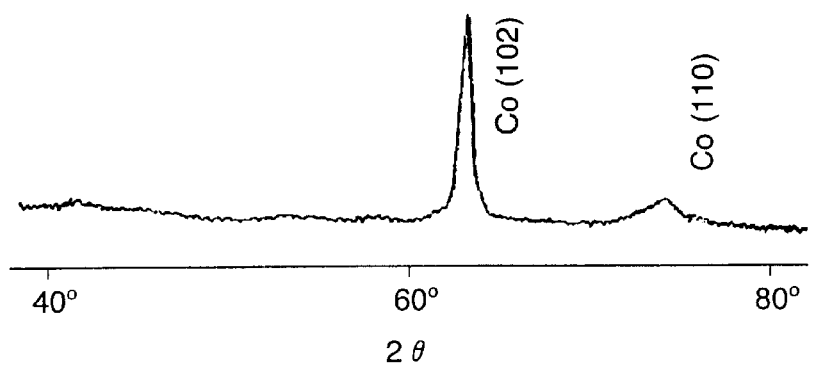
FIG. 3 is a graph showing X-ray diffraction profile of the magnetic layer.

The structure of the magnetic layer 3 was examined by X-ray diffractometry and the results are shown in FIG. 3. As a result, it can be seen that Co (102) was strongly oriented. The lattice constant of the inorganic compound layer 2 and that of the magnetic layer 3 were the same and 0.402 nm. When the surface (three portions of 500×10 nm) of the magnetic layer 3 was observed by an electron microscope, average grain size was 9 nm, and the grain size distribution was 2 nm or less in standard deviation: σ. Thus, it can be seen that grains of the magnetic layer 3 became fine and distribution of the size was uniform. A section of the magnetic recording medium was observed by an electron microscope to find that the magnetic layer 3 epitaxially grew on the inorganic compound layer 2, and crystal grains of the inorganic compound layer and those of the magnetic layer 3 had the same size. Moreover, both the inorganic compound layer 2 and the magnetic layer 3 had prismatic crystal structure and size of the crystal grains did not change.

Next, magnetic properties of the magnetic layer 3 were measured to obtain a coercivity of 3.5 kOe, an Isv of $2.5 \times 10^{-16}$ emu, an S of 0.8 which is indication for squareness of hysteresis at M-H loop, and an S* of 0.86, and thus it had good magnetic properties. From the above, it can be seen that crystal grain size of the magnetic layer was small and the distribution of the size was uniform.

Furthermore, a lubricant was coated on the surface of the magnetic recording medium 10, and this was incorporated in a magnetic recording and read back apparatus, and read/write characteristics were evaluated.

Figure 7A:
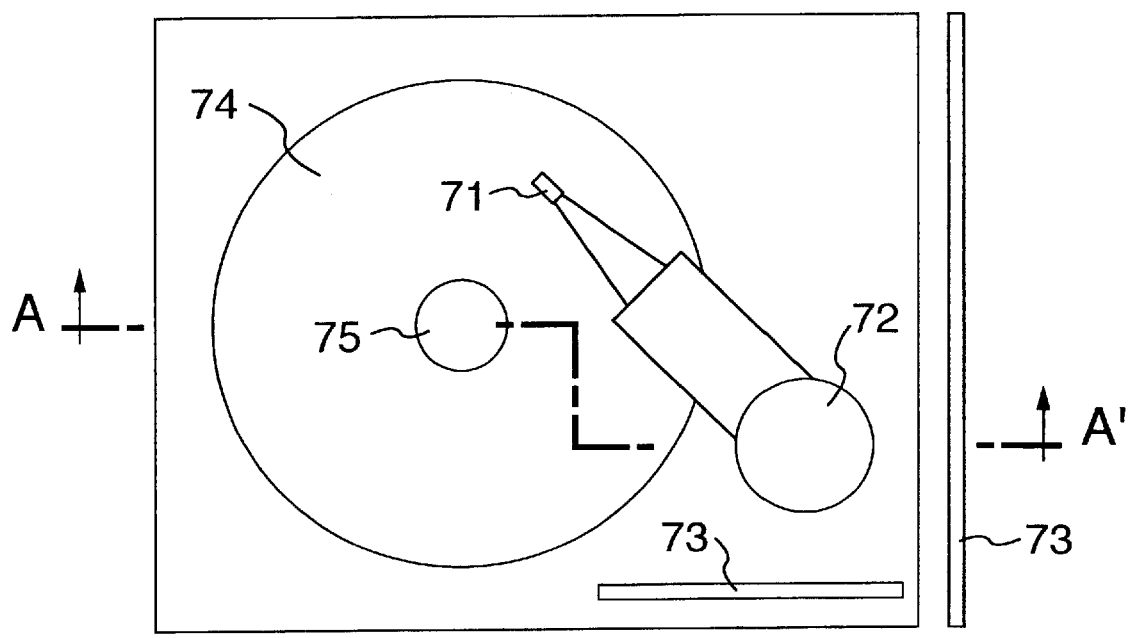
FIG. 7A and FIG. 7B show construction of the magnetic recording apparatus in the Example of the present invention.
Figure 7B:
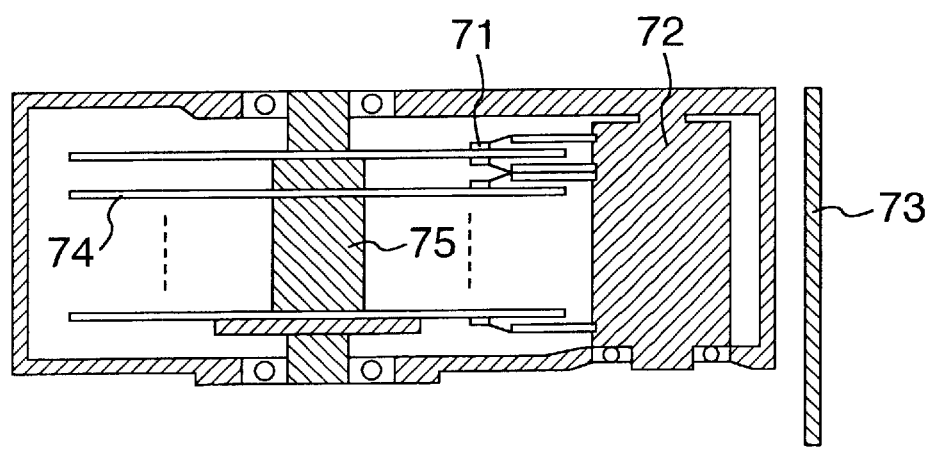

FIG. 7A and FIG. 7B show a plan view and a sectional view of the magnetic recording apparatus of the present invention, respectively. This is a magnetic recording system comprising a magnetic recording medium 74, a driving part 75 which rotates the magnetic recording medium 74, a magnetic head 71 for read/write to the magnetic recording medium 74, a driving part 72 which moves the magnetic head 71 relative to the magnetic recording medium 74, and a read/write signal processing means 73 for signal input to the magnetic head 71 and read back of output signal from the magnetic head 71.

Figure 8:
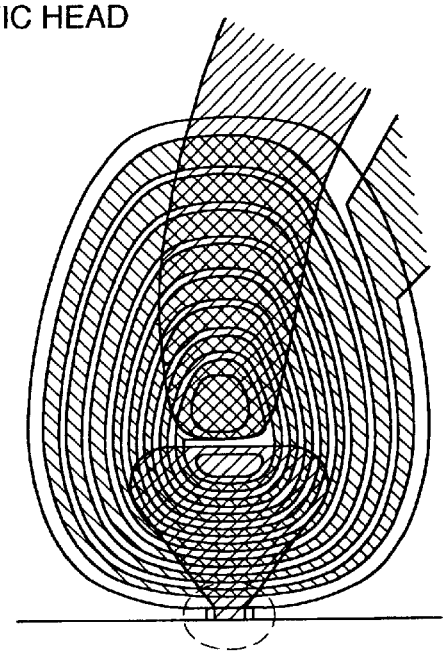
FIG. 8 shows construction of the magnetic head.
Figure 8:
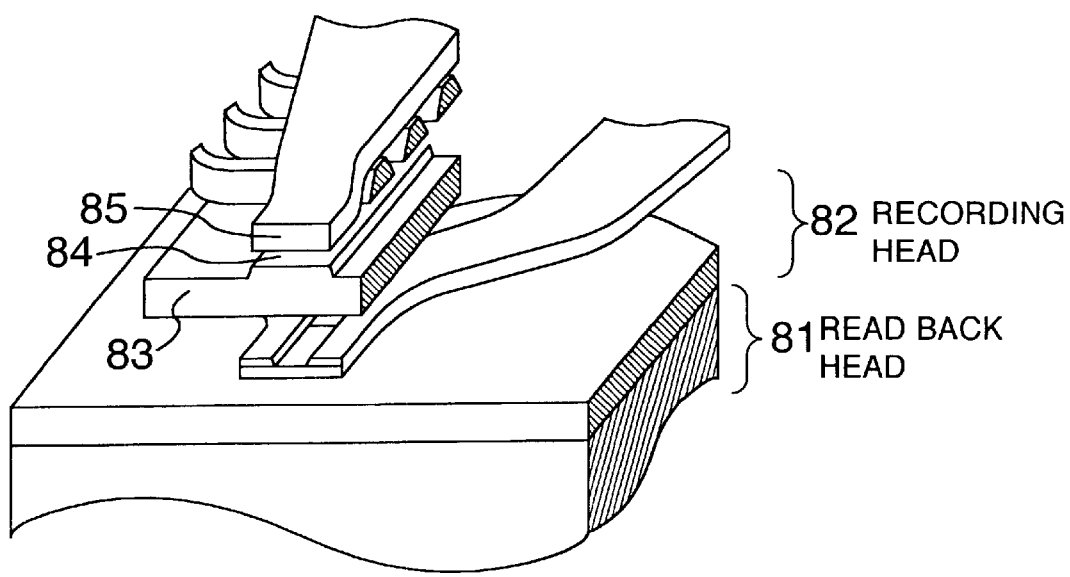
Figure 9:
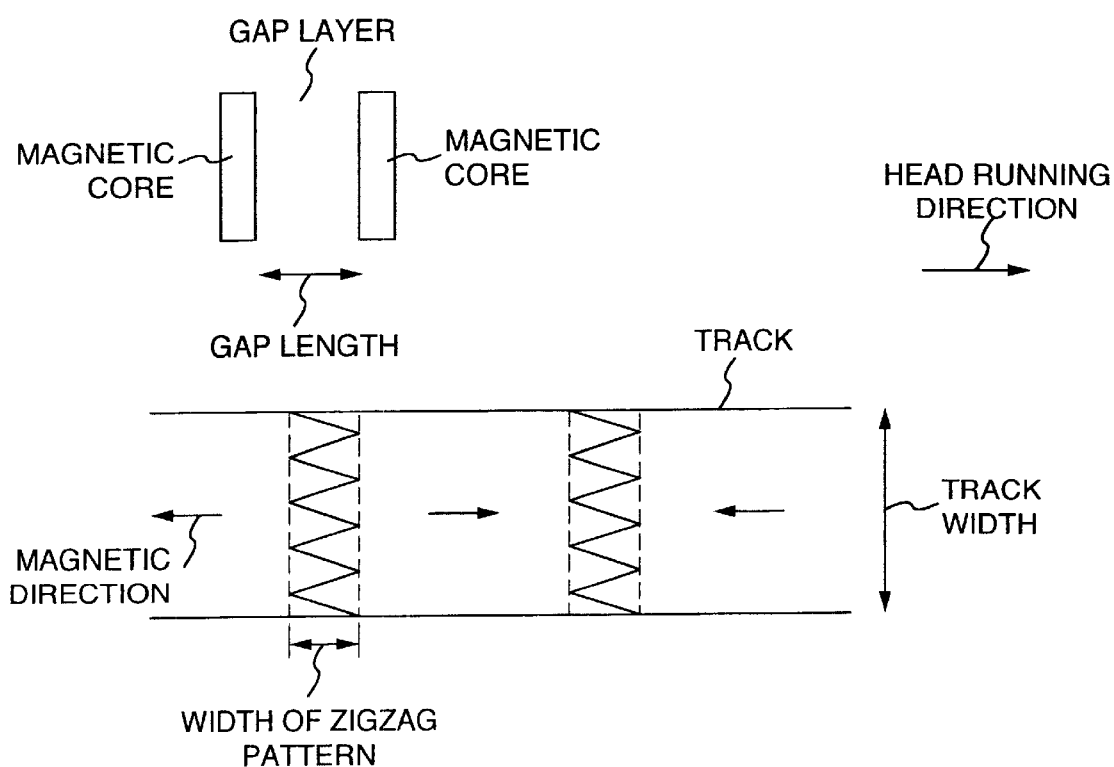
FIG. 9 schematically shows a relation between width of zigzag pattern and gap length.

As shown in FIG. 8, magnetic head 71 comprises read back head 81 and recording head 82. The recording head 82 has upper magnetic core 85, lower magnetic core 83 and gap layer 84. A soft magnetic layer having a highly saturated magnetic flux density of 2.1 T was used as the gap layer 84 of the recording head 82, and the gap length was 0.15 μm. A magnetic head having a giant magnetoresistive effect was used as the read back head 81. The distance between the surface of the magnetic head 71 facing the medium and the magnetic layer of the magnetic recording medium 74 was 20 nm. When a signal corresponding to 20 Gb/in² was recorded in the magnetic recording medium to evaluate S/N, a read output of 32 dB was obtained. A magnetic inversion unit of the magnetic layer was measured by a magnetic force microscope (MFM) to find that this was about 2 to 3 grains and sufficiently small. Furthermore, the area in which zigzag pattern of the magnetic transition region was present was 0.1 μm measured by a magnetic force microscope (MFM), which was less than the gap length of the magnetic head and extremely small. Moreover, thermal fluctuation and thermal decay did not occur. This is due to the small distribution of crystal grain size of the magnetic layer. When error rate of this magnetic recording medium was measured, it was $1 \times 10^{-5}$ or less in terms of the value when signal processing was not conducted.

In this example, cobalt oxide was used as crystal grains of the inorganic compound layer, but grains of the magnetic layer can also be made fine and distribution of the size can be made uniform by using chromium oxide, iron oxide or nickel oxide as the crystal grains. Furthermore, it is also possible to allow aluminum oxide, titanium oxide, tantalum oxide or zinc oxide to be present at the crystal grain boundary.

Moreover, magnetic recording media shown in the following examples can also be applied to such magnetic recording apparatus.

EXAMPLE 2

Figure 4:
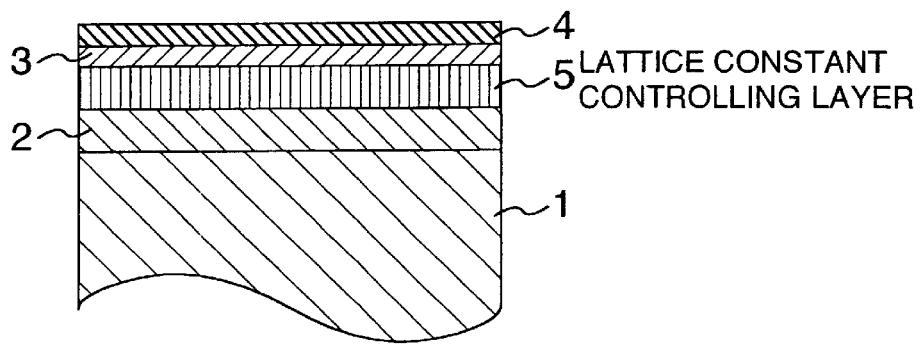
FIG. 4 shows a sectional structure of the magnetic recording medium in Example 2 of the present invention.

FIG. 4 shows the sectional structure of the magnetic recording medium in Example 2 of the present invention. As the substrate, a glass substrate of 2.5" in diameter was used. An inorganic compound layer 2 of 30 nm thick was formed on the substrate 1 by sputtering method using a target comprising a sintered mixture of cobalt oxide (CoO) and zinc oxide (ZnO) at 3:1. The above thickness was such that no peeling from the substrate occurs, taking into consideration the internal stress of the whole magnetic recording medium. For the sputtering, pure Ar was used as a discharge gas, and the discharge gas pressure was 3 mTorr and the applied DC power was 1 kW/150 mmφ. The substrate was heated at 300° C. during the sputtering. The surface of the resulting inorganic compound layer 2 was observed by TEM to find that the surface had a honeycomb structure comprising regular hexagon crystal grains of 10 nm in diameter and amorphous zinc oxide was present at the crystal grain boundary. Lattice constant of the crystal grains of cobalt oxide was larger 20% than that of the magnetic layer 3. It can be seen that size and lattice constant of crystal grains of cobalt oxide changed with changing the amorphous substance present at the grain boundary from silicon oxide in Example 1 to zinc oxide in Example 2. As a result of μ-EDX analysis, it was found that this was because the amorphous substance was dissolved in the crystal grains in the state of a solid solution.

Therefore, in this example, a $Cr_{85}Ti_{15}$ alloy thin layer of 50 nm thick was formed as a lattice constant controlling thin layer 5 having a lattice constant middle between that of the inorganic compound layer 2 and that of the magnetic layer 3 prior to the formation of the magnetic layer 3. Since the lattice constant controlling thin layer 5 can optionally select the lattice constant by controlling the Ti concentration, the difference in lattice constant between the inorganic compound layer 2 and the magnetic layer 3 can be controlled to 10% or less. The lattice constant controlling thin layer 5 was formed by sputtering method using a Cr—Ti alloy target. For the sputtering, pure Ar was used as a discharge gas, and the discharge gas pressure was 3 mTorr and the applied DC power was 1 kW/150 mmφ.

As magnetic layer 3, a $Co_{69}Cr_{19}Pt_{12}$ layer of 12 nm thick was formed on the lattice constant controlling thin layer 5 by sputtering method. For the sputtering, a Co—Cr—Pt alloy target was used, pure Ar was used as a discharge gas, and the discharge gas pressure was 3 mTorr and the applied DC power was 1 kW/150 mmφ.

Finally, a carbon (C) layer of 5 nm thick was formed as a protective layer 4 by sputtering method to obtain a magnetic recording medium 10. For the sputtering, pure Ar was used as the discharge gas, the discharge gas pressure was 5 mTorr, and the applied DC power was 1 kW/150 mmφ. A gas containing nitrogen may be used in place of the Ar gas as the discharge gas, and in this case, C particles become fine and hence the resulting protective layer is densified and the protection performance can be improved.

Figure 5:
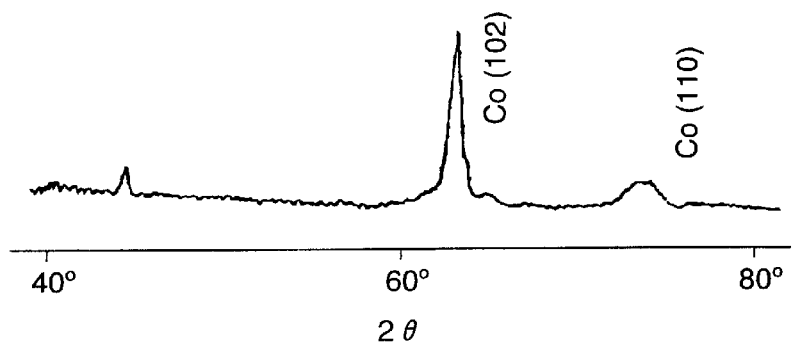
FIG. 5 is a graph showing X-ray diffraction profile of the magnetic layer.

The structure of the magnetic layer 3 was examined by X-ray diffractometry and the results are shown in FIG. 5. From FIG. 5, it can be seen that Co (102) was strongly oriented.

When the surface of the magnetic layer 3 was observed by an electron microscope, average grain size was 8 nm, and the grain size distribution was 3 or less in terms of σ. Thus, it can be seen that crystal grains of the magnetic layer 3 became fine and distribution of the size was uniform. A section of the magnetic recording medium was observed by an electron microscope to find that the crystal grains of the inorganic compound layer 2 and the magnetic layer 3 epitaxially grew. Moreover, crystal grains of both the inorganic compound layer 2 and the magnetic layer 3 had prismatic crystal structure and size of the crystal grains did not change.

Furthermore, magnetic properties of the magnetic layer 3 were measured. The magnetic properties obtained were a coercivity of 4.0 kOe, an Isv of $2.5 \times 10^{-16}$ emu, an S of 0.81 which is indication for squareness of hysteresis at M-H loop, and an S* of 0.85, and thus it had good magnetic properties.

Next, a lubricant was coated on the surface of the magnetic recording medium 10, and read/write characteristics were evaluated in the same manner as in Example 1. When a signal corresponding to 20 GB/in$^2$ was recorded in the magnetic recording medium to evaluate S/N, a read output of 32 dB was obtained. A magnetic inversion unit of the magnetic layer was measured by a magnetic force microscope (MFM) to find that this was about 2 to 3 grains and sufficiently small. Furthermore, the area in which zigzag pattern of the magnetic transition region was present was 0.1 μm, which was less than the gap length (0.15 μm)of the recording head and extremely small. Moreover, thermal fluctuation and thermal decay did not occur. When failure rate of this magnetic recording medium was measured, it was $1 \times 10^{-5}$ or less in terms of the value when signal processing was not conducted.

EXAMPLE 3

Example 3 illustrates an example of controlling the lattice constant of crystal grains of cobalt oxide without using the lattice constant controlling thin layer.

First, as substrate 1, a glass substrate of 2.5" in diameter was used. An inorganic compound layer 2 of 30 nm thick was formed on the substrate 1 by simultaneous sputtering method using a binary target comprising a target of a sintered mixture of CoO and Fe$_2$O$_3$ at 3:1 and a target of ZnO. Applied power was adjusted so that the respective targets were sputtered at 2:1. For the sputtering, pure Ar was used as a discharge gas, and the discharge gas pressure was 3 mTorr. The sputtering was conducted at room temperature. The surface of the resulting inorganic compound layer 2 was observed by TEM to find that crystal grains having honeycomb structure of regular hexagon of 9 nm were regularly arranged as in Example 1. The spacing between crystal grains was 0.5–1.0 nm. Iron was present in the space between the crystal grains of cobalt oxide, and silicon oxide was present at the grain boundary. Observation by X-ray diffractometry shows that the cobalt oxide was crystal grains and the silicon oxide was amorphous. Lattice constant was nearly equal to that of Co which was a main component of the magnetic layer.

In Example 2, the lattice constant of the magnetic layer differed from that of crystal grains of cobalt oxide in the inorganic compound layer. However, lattice constant of the crystal grains in the inorganic compound layer can be controlled by adding iron oxide to cobalt oxide, and can be made nearly equal to that of the magnetic layer.

Further, a Co$_{69}$Cr$_{19}$Pt$_{12}$ layer of 12 nm thick was formed as a magnetic layer 3 on the inorganic compound layer 2 by sputtering method. A Co—Cr—Pt alloy was used as a target in the sputtering, and pure Ar was used as the discharge gas. The discharge gas pressure was 3 mTorr and the applied DC power was 1 kW/150 mmφ. The substrate was heated at 300° C. during the sputtering.

Finally, a C layer of 5 nm thick was formed as a protective layer 4 by sputtering method to obtain a magnetic recording medium. For the sputtering, the discharge gas was pure Ar, the discharge gas pressure was 5 mTorr, and the applied DC power was 1 kW/150 mmφ.

Next, the structure of the magnetic layer 3 was examined by X-ray diffractometry and the results are shown in FIG. 3. As a result, it can be seen that Co (102) was strongly oriented. The lattice constant of the inorganic compound layer 2 and that of the magnetic layer 3 were nearly the same and 0.402 nm. When the surface of the magnetic layer was observed by an electron microscope, average grain size was 9 nm, and the grain size distribution was 2 nm or less in standard deviation: σ. Thus, it can be seen that the crystal grains of the magnetic layer 3 became fine and the distribution of the size was uniform. A section of the magnetic recording medium was observed by an electron microscope to find that the inorganic compound layer and the magnetic layer epitaxially grew, and the crystal grains had the same size. Moreover, the crystal grains of both the inorganic compound layer and the magnetic layer had prismatic structure and size of the crystal grains did not change.

Furthermore, magnetic properties of the magnetic layer were measured. The magnetic properties obtained were a coercivity of 3.5 kOe, an Isv of $2.5 \times 10^{-16}$ emu, an S of 0.8 which is indication for squareness of hysteresis at M-H loop, and an S* of 0.86, and thus it had good magnetic properties. This is because the crystal grains of the magnetic layer were fine and the size distribution was uniform.

Next, a lubricant was coated on the surface of the magnetic recording medium 10, and read/write characteristics were evaluated in the same manner as in Example 1. When a signal corresponding to 20 Gb/in$^2$ was recorded in the magnetic recording medium to evaluate S/N, a read output of 32 dB was obtained. A magnetic inversion unit of the magnetic layer was measured by a magnetic force microscope (MFM) to find that this was about 2 to 3 grains and sufficiently small. Furthermore, the area in which zigzag pattern of the magnetic transition region was present was 0.1 μm, which was less than the gap length (0.15 μm)of the recording head and extremely small. Moreover, thermal fluctuation and thermal decay did not occur. When failure rate of this magnetic recording medium was measured, it was $1 \times 10^{-5}$ or less in terms of the value when signal processing was not conducted.

EXAMPLE 4

Example 4 illustrates an example where spacing between crystal grains was controlled by suitably selecting the amorphous substance in the inorganic compound layer.

As substrate 1, a glass substrate of 2.5" in diameter was used. An inorganic compound layer 2 of 30 nm thick was formed on the substrate 1 by simultaneous binary sputtering method using two targets of a sintered cobalt oxide (CoO) and a sintered mixture of $SiO_2$ and $TiO_2$ at 3:1. For the sputtering, pure Ar was used as a discharge gas, and the discharge gas pressure was 3 mTorr. Applied RF power was adjusted so that the CoO target and the $SiO_2$-$TiO_2$ target were sputtered at 2:1.

The surface of the resulting inorganic compound layer 2 was observed by TEM to find that it had a honeycomb structure in which crystal grains of regular hexagon of 9 nm were regularly arranged as in FIG. 2. Furthermore, analysis by $\mu$-EDX showed that the crystal grains comprised cobalt oxide, and the silicon oxide present at crystal grain boundary was amorphous. The spacing between crystal grains was 1 nm. This spacing could be controlled by changing the ratio of $SiO_2$ and $TiO_2$. Moreover, the spacing between the crystal grains could be extended to about 2–3 nm by using zinc oxide in place of $TiO_2$.

Next, a $Co_{69}Cr_{19}Pt_{12}$ layer of 12 nm thick was formed as a magnetic layer 3 on the inorganic compound layer 2 by sputtering method. A Co—Cr—Pt alloy was used as a target in the sputtering, and pure Ar was used as the discharge gas. The discharge gas pressure was 3 mTorr and the applied DC power was 1 kW/150 mm$\phi$. The substrate was heated at 300° C. during the sputtering.

Finally, a C layer of 5 nm thick was formed as a protective layer 4 by sputtering method to obtain a magnetic recording medium. For the sputtering, the discharge gas was Ar, the discharge gas pressure was 5 mTorr, and the applied DC power was 1 kW/150 mm$\phi$.

Next, the structure of the inorganic compound layer was examined by X-ray diffractometry to find a diffraction peak at around $2\theta=62.5°$ corresponding to CoO(220). No other clear peaks were observed. A very broad peak was observed at around $2\theta=44°$, and it is considered that this is because of overlapping of a peak caused by the glass substrate and a peak caused by the amorphous substance at the grain boundary.

Further, the structure of the magnetic layer was examined by X-ray diffractometry to find that Co(102) as strongly oriented. This is reflective of the fact hat CoO(220) was oriented in the inorganic compound layer, and shows that the magnetic layer epitaxially grew on the inorganic compound layer. The orientation of Co in the magnetic layer is suitable for high density recording.

When the surface of the magnetic layer was observed by an electron microscope, average grain size (nearly circular) was 10 nm, and the grain size distribution was 1.5 nm or less in terms of standard deviation: a and was very small. As compared with a magnetic recording medium in which the inorganic compound layer was not formed, Co(102) plane was not observed in the comparative medium. Thus, it can be seen that the inorganic compound layer of the present invention greatly contributes to control of orientation of the magnetic layer.

Observation of a section of the magnetic recording medium showed that the magnetic layer epitaxially grew on the inorganic compound layer. Moreover, it can be seen that the crystal grains of both the inorganic compound layer and the magnetic layer had prismatic structure and the size of the crystal grains did not change. Moreover, spacing between crystal grains of the inorganic compound layer 2 was 1.0 nm, and it can be seen that since the magnetic layer epitaxially grew on the crystal grains of the inorganic compound layer, the crystal grains of the magnetic layer were physically isolated from each other. As a result, there is the effect that magnetic interaction between the crystal grains of the magnetic layer can be diminished.

Next, magnetic properties of the magnetic layer were measured. The magnetic properties obtained were a coercivity of 3.5 kOe, an Isv of $2.5 \times 10^{-16}$ emu, an S of 0.8 which is an indication for squareness of hysteresis at M-H loop, and an S* of 0.86, and thus it had good magnetic properties. This is because the crystal grains of the magnetic layer were fine and the size distribution was uniform.

Next, a lubricant was coated on the surface of the magnetic recording medium 10, and read/write characteristics were evaluated in the same manner as in Example 1. When a signal corresponding to 20 Gb/in$^2$ was recorded in the magnetic recording medium to evaluate S/N, a read output of 32 dB was obtained. A magnetic inversion unit of the magnetic layer was measured by a magnetic force microscope (MFM) to find that this was about 2 to 3 grains and was sufficiently small. Furthermore, the area in which zigzag pattern of the magnetic transition region was present was 0.1 $\mu$m, which was less than the gap length (0.15 $\mu$m)of the magnetic head and was extremely small. Moreover, thermal fluctuation and thermal decay did not occur. When failure rate of this magnetic recording medium was measured, it was $1 \times 10^{-5}$ or less in terms of the value obtained when signal processing was not conducted.

EXAMPLE 5

Example 5 illustrates an example where a disk substrate was formed using the inorganic compound layer of the present invention.

Figure 6:
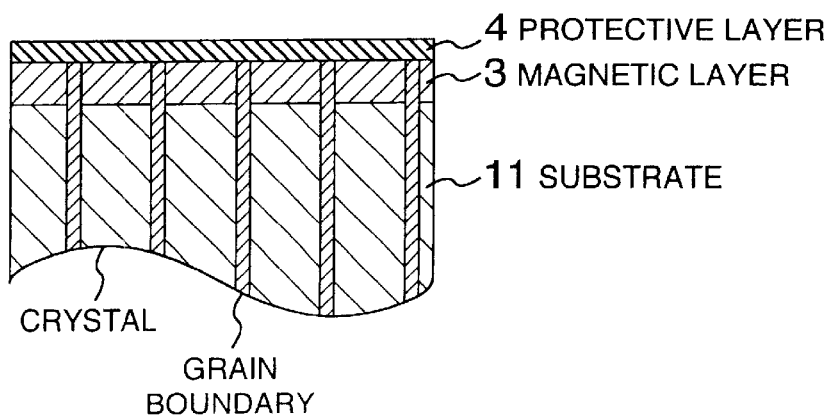
FIG. 6 shows a sectional structure of the magnetic recording medium in Example 5 of the present invention.

A sectional structure of the magnetic recording medium in Example 5 is shown in FIG. 6.

First, an inorganic compound layer in which amorphous silicon oxide ($SiO_2$) was present at grain boundary of cobalt oxide (CoO) crystal grains was employed as substrate 11. A section of the resulting substrate was observed by TEM to find that it had a honeycomb structure in which crystal grains of regular hexagon of 10 nm were regularly arranged, and the spacing between crystal grains was 0.5–1.0 nm. Observation of a section of the inorganic compound layer showed a prismatic structure as shown in FIG. 6.

A $Co_{69}Cr_{19}Pt_{12}$ layer of 12 nm thick was formed as a magnetic layer 3 on the substrate 11 by sputtering method. A Co—Cr—Pt alloy was used as a target in the sputtering, and pure Ar was used as the discharge gas. The discharge gas pressure was 3 mTorr and the applied DC power was 1 kW/150 mm$\phi$. The substrate 11 was heated at 300° C. during the sputtering.

Finally, a C layer of 5 nm thick was formed as a protective layer 4 by sputtering method to obtain a magnetic recording medium. For the sputtering, the discharge gas was Ar, the discharge gas pressure was 5 mTorr, and the applied DC power was 1 kW/150 mm$\phi$.

Further, the structure of the magnetic layer was examined by X-ray diffractometry to find that Co(102) was strongly oriented as in Example 1. When the surface of the magnetic layer was observed by an electron microscope, average grain size was 10 nm, and the grain size distribution was 2 nm or less in terms of standard deviation: $\sigma$. Observation of a section of the layer showed that the magnetic layer 3 epitaxially grew on the substrate 11 of the inorganic compound layer, and the crystal grains of both the layers had nearly the same size. Furthermore, the crystal grains of the substrate 11 of the inorganic compound layer and the magnetic layer 3 had prismatic structure and the size of the crystal grains did not change.

Magnetic properties of the magnetic layer were measured. The magnetic properties obtained were a coercivity of 3.5 kOe, an Isv of $2.5 \times 10^{-16}$ emu, an S of 0.8 which is an indication for squareness of hysteresis at M-H loop, and an S* of 0.86, and thus it had good magnetic properties. This is because the crystal grains of the magnetic layer were fine and the size distribution was uniform.

Next, a lubricant was coated on the surface of the magnetic recording medium 10, and read/write characteristics were evaluated in the same manner as in Example 1. When a signal corresponding to 20 Gb/in² was recorded in the magnetic recording medium to evaluate S/N, a read output of 32 dB was obtained. A magnetic inversion unit of the magnetic layer was measured by a magnetic force microscope (MFM) to find that this was about 2 to 3 grains and was sufficiently small. Furthermore, the area in which zigzag pattern of the magnetic transition region was present was 0.1 $\mu$m, which was less than the gap length (0.15 $\mu$m) of the magnetic head and was extremely small. Moreover, thermal fluctuation and thermal decay did not occur. When failure rate of this magnetic recording medium was measured, it was $1 \times 10^{-5}$ or less in terms of the value obtained when signal processing was not conducted.

According to the present invention, crystal grains of a magnetic layer can be made fine and crystal grain size distribution can be small by epitaxially growing the magnetic layer on an inorganic compound layer small in crystal grain size distribution. Thus, magnetic recording media low in noise and diminished in thermal fluctuation and thermal decay can be realized.

Moreover, since control of crystal orientation of the magnetic layer is possible, the magnetic layer can have an orientation suitable for high density magnetic recording.

Furthermore, spacing between crystal grains of the magnetic layer can be controlled, and, hence, interaction between the crystal grains of the magnetic layer can be reduced. As a result, magnetic recording media of low noise and fine magnetic domains can be obtained and high density recording becomes possible.

What is claimed is:

1. A magnetic recording medium comprising
   a nonmagnetic substrate,
   an inorganic compound layer including a crystalline first oxide and a crystalline second oxide, said inorganic compound layer being formed on the substrate, and
   a magnetic layer formed on said inorganic compound layer,
      wherein said crystalline first oxide comprises at least one oxide selected from the group consisting of cobalt oxide, chromium oxide, iron oxide and nickel oxide,
      said second oxide comprising at least one oxide selected from the group consisting of silicon oxide, aluminum oxide, titanium oxide, tantalum oxide and zinc oxide, and
      said second oxide is present at a grain boundary of crystal grains of said first oxide,
   wherein said inorganic compound layer has a thickness of 10–100 nm.

2. A magnetic recording medium according to claim 1, wherein the second oxide constructing the inorganic compound layer is amorphous.

3. A magnetic recording medium according to claim 1, wherein the difference of lattice constant of the magnetic grains constituting the magnetic layer from that of the crystal grains of the first oxide constituting the inorganic compound layer is within the range of ±10%.

4. A magnetic recording medium according to claim 1, wherein the magnetic layer is a ferromagnetic layer comprising an alloy containing Co as a component and additionally containing Pt and at least one element selected from the group consisting of Cr, Ta and Nb.

5. A magnetic recording medium according to claim 4, wherein the magnetic layer has a structure of at least one element selected from the group consisting of Cr, Ta and Nb being present at the grain boundary of crystal grains comprising Co as a component.

6. A magnetic disk apparatus which comprises
   a magnetic recording medium,
   a driving mechanism which rotates the magnetic recording medium and
   a magnetic head which carries out read/write for the magnetic recording medium,
   wherein said magnetic recording medium comprises
      a nonmagnetic substrate,
      an inorganic compound layer including a crystalline first oxide and a crystalline second oxide, said inorganic compound layer being formed on the substrate, and
      a magnetic layer formed on said inorganic compound layer, wherein
         said crystalline first oxide comprises at least one oxide selected from the group consisting of cobalt oxide, chromium oxide, iron oxide and nickel oxide,
         said second oxide comprising at least one oxide selected from the group consisting of silicon oxide, aluminum oxide, titanium oxide, tantalum oxide and zinc oxide, and
         said second oxide is present at a grain boundary of crystal grains of said first oxide.

* * * * *